Aug. 31, 1954  K. A. DOUTT  2,688,066
HYDRAULIC FLASH WELDER CONTROL
Filed July 22, 1953  3 Sheets-Sheet 3

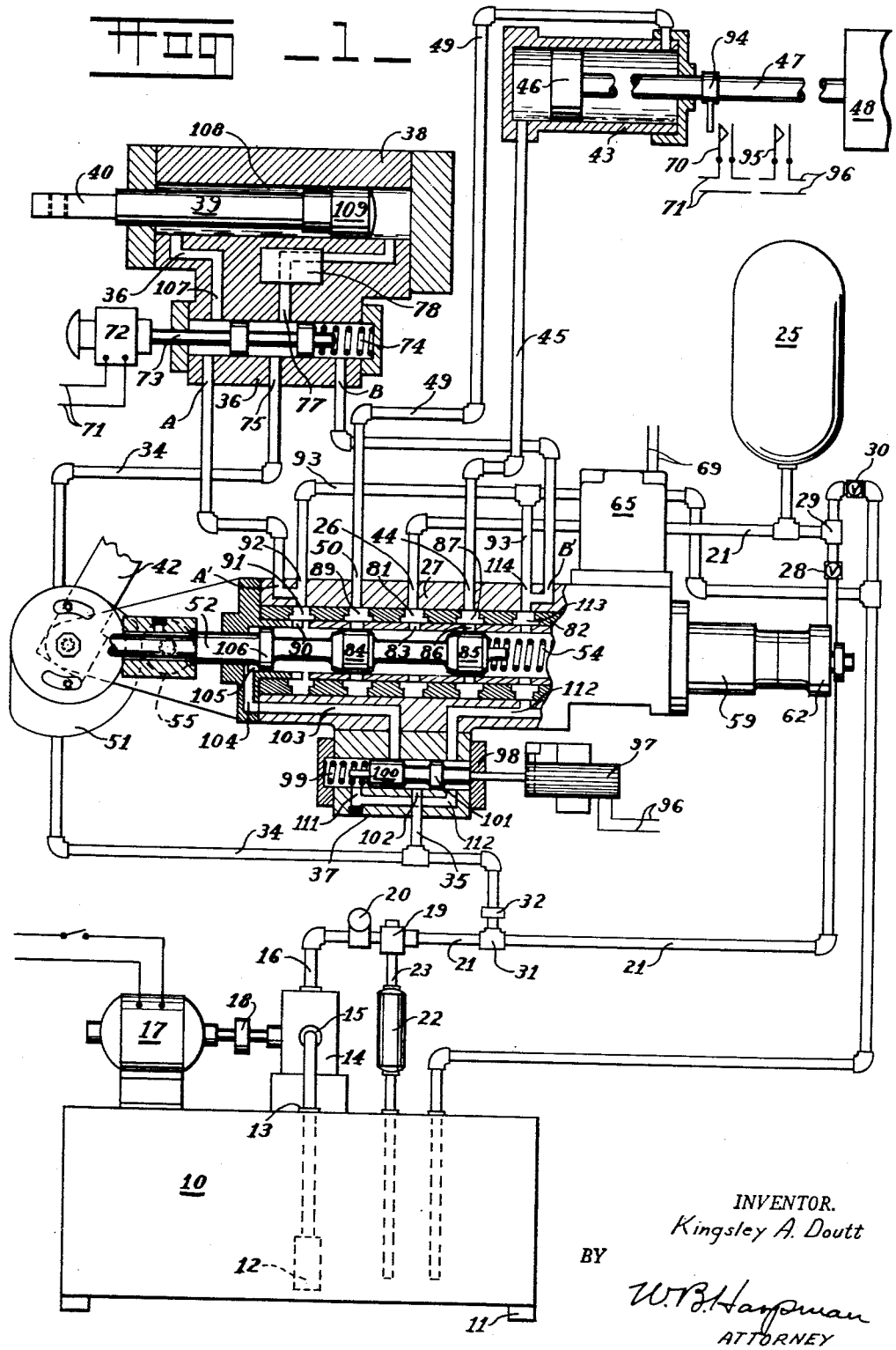

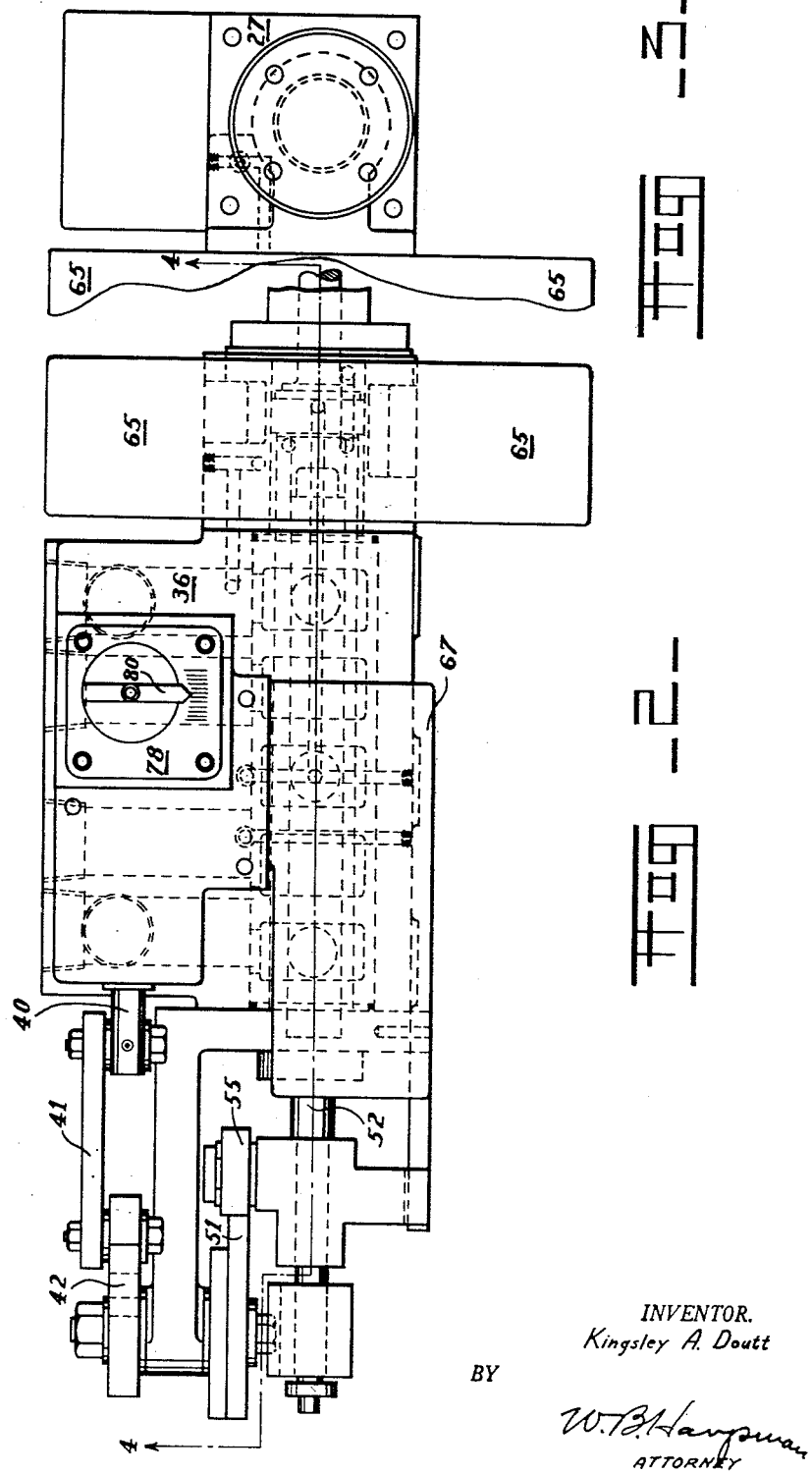

INVENTOR.
Kingsley A Doutt
BY
W. B. Harpman
ATTORNEY

Patented Aug. 31, 1954

2,688,066

UNITED STATES PATENT OFFICE 2,688,066

HYDRAULIC FLASH WELDER CONTROL

Kingsley A. Doutt, Alpena, Mich.

Application July 22, 1953, Serial No. 369,578

5 Claims. (Cl. 219—4)

This invention relates to electric welding apparatus and more particularly to an improved apparatus for imparting controlled movement to the movable platen of a flash welding machine.

Flash welding machines as known in the art comprise essentially an insulated normally fixed platen having an electrode and means to secure a workpiece thereto. A movable platen is also provided and includes an electrode and workpiece securing means. The movable platen is arranged for sliding movement toward and away from the fixed platen and means is provided for imparting such movement thereto. In the present disclosure at least one hydraulic cylinder and piston assembly is provided, the piston being connected to the movable platen.

In order that a controlled volume of hydraulic fluid may be supplied to the piston and cylinder assembly utilized, various types of valves and valve controlling means have been heretofore proposed and used. Such devices have generally had in common a mechanical connection with the movable platen of the flash welding machine so that the valves or other devices controlling and moving the movable platen were in turn controlled by the position of the movable platen itself and/or the speed of travel thereof. Those skilled in the art recognize that such dependency of the controlling elements of a flash welding machine is subject to variation depending upon the characteristics of the platen and workpiece, etc., to the end that an unequal and often undesirable action follows which results in an unsatisfactory weld.

Those skilled in the art are also aware that an improved welding technique will result from a desirably controlled and time flash welding operation and it is, therefore, a principal object of this invention to provide a hydraulic flash welder control operating to impart a most desirable welding cycle movement and control to the movable platen of the flash welding machine regardless of variations in the hydraulic pressure utilized, conditions effecting the movable platen and variations in the workpieces as to size, thickness, material, shape, etc.

A further object of the invention is the provision of a hydraulic flash welding control for a flash welding machine arranged to perform a complete welding cycle from flashing to upsetting with no hesitation in the controlled and timed advance of the movable platen and operating in effect to superimpose upsetting action on a continuing flashing action.

Those skilled in the art will recognize that flash welder controls as heretofore known in the art had a common weakness in controlling the motion of the movable platen of the flash welding machine in the welding cycle, particularly in that hesitancy in the forward progressive motion of the movable platen frequently resulted in no weld or a poor weld due to instantaneous oxidation of various metals occurring at the time of hesitation or momentary interruption between the flashing and upsetting action in the flash welding machine. The present invention enables a continuous performance cycle and thereby eliminates completely the possibility of no welds or poor welds due to such oxidation.

A still further object of the invention is the provision of an improved apparatus for imparting controlled movement to the movable platen of a flash welding machine and which apparatus produces a flashing cycle in accordance with its preset controls and superimposes an upset cycle on the flashing cycle, the movement of the platen during the flashing cycle being responsive only to the apparatus and the upset cycle being responsive to the position of the platen and workpieces.

A still further object of the invention is the provision of a control system for a flash welder as above outlined which facilitates and simplifies the setting up of the welding machine to perform a particular welding operation and the apparatus therefore includes means for readily changing the pattern of movement of the platen during flashing and, in accordance with a preferred embodiment of the invention, the same is accomplished by employing a simple and positive valve actuated control of the apparatus incorporating relatively movable valve members enabling various desired settings to be readily achieved.

A still further object of the invention is the attainment of a wider diversity and greater accuracy in the control of the variables making up a flash welding operation. For example, the pattern of the rate of change of the movable platen during the flashing action may be readily varied with respect to time and the interval between the initiation of flashing and the start of the upsetting. Such variable factors enable a much higher degree of control over the welding operation to be achieved and thereby contribute substantially to the quality of the work performed.

A still further object of the invention is the provision of a hydraulic welder control which facilitates and simplifies the setting up of the welding machine to perform a particular welding operation especially when the operation is to be repeated under automatic control. The invention, therefore, includes means for readily changing the pattern of movement of the movable platen during the flashing and upsetting portions of the welding cycle, the device being so arranged that regardless of the adjustments made, a complete cycling of the flash welding machine always occurs.

A still further object of the invention is the provision of a hydraulic flash welding control mechanism enabling a flash welding operation to start instantaneously and particularly with respect to the immediate movement of the movable platen of the flash welding machine.

A still further object of the invention is the provision of a hydraulic flash welding control mechanism for a flash welding machine which will impart immediate and smooth action to the movable platen of the flash welding machine and continue such smooth progressive movement of the movable platen in accordance with a predetermined flashing and upsetting cycle whether or not the movable platen is dry or lubricated and regardless of the weight, shape, material or other characteristics of the workpiece to the end that a perfect flash weld is obtained.

A still further object of the invention is the provision of a hydraulic flash welding control mechanism providing an adjustable starting velocity enabling the mechanism to be readily set to match the characteristics of various metals being welded.

A still further object of the invention is the provision of a hydraulic flash welding control mechanism that will automatically weld parts of unequal length which must have the same finished length.

A still further object of the invention is the provision of a hydraulic flash welding control mechanism that eliminates the need of a skilled operator as the device automatically provides for moving the pieces to be welded together from an uneven gap at a proper speed for proper flashing and welding.

A still further object of the invention is the provision of a hydraulic flash welding control mechanism that will control the platen position of a flash welding machine without mechanical stops as heretofore believed necessary.

The hydraulic flash welding control mechanism disclosed herein comprises an improvement over the mechanism shown in my co-pending patent application Serial No. 189,835 filed October 12, 1950, now U. S. Patent 2,640,134 dated May 26, 1953, the primary improvement comprising the elimination of the connecting linkage which I heretofore believed necessary to position the sleeve of the valve with respect to the spindle thereof and the substitution of a hydraulically actuated, more readily controlled device for more advantageously imparting movement to the sleeve of the valve.

A still further object of the invention is the provision of a hydraulic flash welding control mechanism that is particularly advantageously employed in welding strip steel sections to one another in a steel mill and wherein the area of the metal to be welded varies as well as the spacing between the sections to be welded and which operation must be efficiently done to not interfere with the further processing of the strip.

Those skilled in the art will recognize that it has heretofore been the practice in such operations to manually control the platen movement to bring the ends of the strip sections to be welded to position closely approximating the starting position of the flashing portion of the welding cycle, which operation required a skilled operator and consumed considerable valuable time.

The present apparatus automatically and rapidly moves the platens and hence the strips to be welded to one another to proper flashing position and automatically starts the flashing operation regardless of the gap between the workpieces. The ability of the mechanism to accomplish this action results in the starting of the flashing cycle at proper platen speed and thereby insures the successful weld of the parts as the flashing cycle is properly timed and achieves its intended purpose prior to the upset and welding portions of the complete welding cycle.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a schematic diagram of the hydraulic flash welder control apparatus.

Figure 2 is a top plan view of a portion of the apparatus shown in Figure 1.

Figure 3 is an end elevation of the portion of the apparatus shown in Figure 2.

Figure 4:
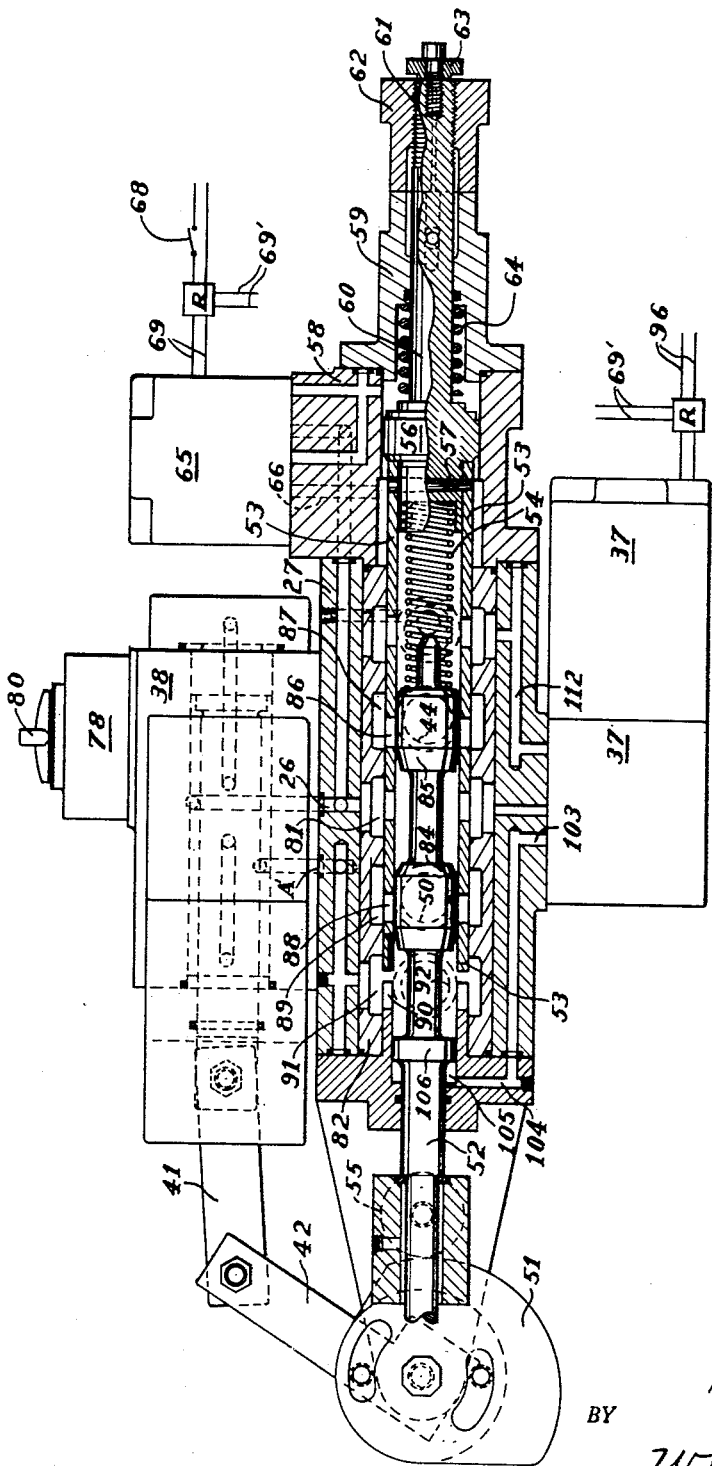
Figure 4 is a vertical section taken on line 4—4 of Figure 2.

By referring to the drawings and Figure 1 in particular it will be seen that a hydraulic flash welder control is disclosed and that the same may be formed as a compact assembled unit including the control apparatus and the hydraulic fluid supply for the flash welding machine and that the complete hydraulic flash welder control can be connected with any flash welder to suitably operate the movable platen thereof to perform an improved flashing and upsetting welding cycle. Specifically, in Figure 1 of the drawings the numeral 10 indicates a tank which actually forms a supporting base for the remainder of the apparatus and provided with projecting feet 11—11 so that the same may be attached to a flash welding machine or positioned in proximity thereto. The tank 10 comprises a reservoir for the hydraulic fluid utilized and a filter 12 is disposed in the tank 10 and connected with the outlet orifice 13 thereof which in turn is in direct communication with a pump 14. The inlet orifice of the pump 14 is indicated by the numeral 15 and the outlet orifice is indicated by the numeral 16. The pump 14 is driven by an electric motor 17 which is connected to the pump 14 by means of a coupling 18. A relief valve 19 having a pressure gauge 20 receives the hydraulic fluid from the pump 14 as the same is in communication with the outlet orifice 16 of the pump 14.

A fluid supply line 21 connects with the relief valve 19 and with the controlling apparatus hereinafter described. The pressure relief valve is arranged so that at such time as the flash welding machine is inoperative, hydraulic fluid from the pump 14 is by-passed through an oil cooler 22 which is connected with the relief valve 19 by means of a tubular fitting 23 and with the tank 10 by means of a tubular fitting 24.

At such time as a flash welding machine controlled by the hydraulic flash welder control disclosed herein is in operation, as, for example, a flashing and upsetting cycle, hydraulic fluid flows from the relief valve 19 through the fluid supply line 21 directly to an accumulator 25 which is preferably of the air bladder type and to a high pressure inlet port 26 on a flashing and upset control valve 27. A check valve 28 is positioned in the fluid supply line 21 between the relief valve 19 and the accumulator 25 and permits fluid flow only toward the accumulator and the flashing and upset control valve 27.

Still referring to Figure 1 of the drawings it will be observed that the fluid supply line 21 includes a T 29, a portion of which communicates by way of a normally closed valve 30 with the tank 10 and which valve 30 is provided to permit the accumulator 25 to be drained. A second T 31 in the fluid supply line 21 connects with a pressure reducing valve 32. A supply line 33 conveys hydraulic fluid at reduced pressure from the pressure reducing valve 32 to two low pressure supply lines 34 and 35 communicating respectively with a sequence starting valve 36 positioned above the flashing and upset control valve 27 and with an upset pilot valve 37 which is disposed beneath the flashing and upset control valve 27.

Positioned adjacent the sequence starting valve 36 there is a flash control valve 38 including a reciprocally positioned piston 39, an end 40 of which extends outwardly of the ends of the flash control valve 38 and the left hand end of which (as best illustrated in Figures 2 and 4 of the drawings) is pivotally connected to a link 41 which in turn is pivotally connected to a cam arm 42. The sequence starting valve 36 and the flash control valve 38 are integrally formed. It will be observed that ports A and B in the sequence starting valve are in communication with ports A' and B' in the flashing and upset control valve 27 which is shown in vertical section in Figures 1 and 4 of the drawings and in communication with the upset pilot valve 37 which is directly connected thereto.

It will thus be seen that fluid pressure from the pump 14 and the accumulator 25 flows by way of the fluid supply line 21 directly to the inlet port 26 in the flashing and upset control valve 27 where it is controlled with respect to communication with a hydraulic cylinder 43. An outlet port 44 in the flashing and upset control valve 27 is connected by means of a fluid supply line 45 with the closed end of the hydraulic cylinder 43. A piston 46 is positioned within the cylinder 43 and a connecting rod 47 extends outwardly through the opposite end of the cylinder 43 and connects with a movable platen 48 of the welding apparatus. A return fluid line 49 establishes communication with the rod end of the cylinder 43 and with a port 50 in the flashing and upset control valve 27.

In Figures 2 and 4 of the drawings the cam arm 42 is shown connected with a cam 51 so that movement imparted to the cam arm 42 through the link 41 by the piston 40 in the flash control valve and piston 39 may be imparted to a spool 52 forming the multiple valve element in the flashing and upset control valve 27, as best illustrated in Figures 1 and 4 of the drawings.

Still referring to Figures 1 and 4 of the drawings it will be seen that the spool 52 is reciprocally positioned in a sleeve 53 which in turn is reciprocally positioned in the body of the flashing and upset control valve 27. A plurality of slot-like ports are formed in the sleeve 53 for registry with a plurality of ports in the body of the valve 27 and more particularly with a hardened tubular insert positioned therein and defining the actual orifices, as hereinafter described. The spool 52 is spring urged toward the left as shown in Figures 1 and 4 of the drawings by a coil spring 54 positioned in the right hand end of the sleeve 53 and the outermost left hand end of the spool 52 is provided with a rotor 55 engaging the cam 51. The right hand end of the sleeve 53, as shown in Figures 1, 2 and 4, is connected with a driving piston 56 by means of a pin 57 which is positioned through registering transversely formed openings in the adjacent ends of the sleeve 53 and the driving piston 56. The driving piston 56 is positioned within an axial extension 58 of the flashing and upset control valve 27 and in turn carries a head 59 on its outer end. A piston rod 60 extends from the driving piston 56 outwardly through the head 59 and through the end portion thereof and terminates in a threaded section 61 which is threadably received in an adjustment nut 62.

A secondary adjustment nut 63 is threadably engaged in a threaded axial opening within the end of the piston rod 60. It will be observed that by rotating the adjustment nut 62 on the threaded section 61 of the piston rod 60, the relative position of the piston rod 60 and hence the driving rod 56 and the sleeve 53 may be controlled with respect to maximum inward travel of the sleeve 53 to the left as shown in Figures 1 and 4 of the drawings.

A secondary spring 64 positioned within the head 59 and abutting a shoulder thereon on one side and the piston 56 on the other normally biases the piston 56 and hence the sleeve 53 inwardly of the valve or to the left as shown in Figures 1 and 4 of the drawings.

The extension 58 on the valve 27 also carries a sleeve positioning valve 65 which comprises a double solenoid actuated four-way valve normally spring centered to fully closed position which acts to control the flow of hydraulic fluid to and from the areas on either side of the piston 56 in the extension 58 of the valve 27. When the sleeve positioning valve 65 is actuated to introduce hydraulic fluid into the area on the left hand side of the piston 56 as by way of passageways 66 therein, the resulting action will be to move the piston 56 to the extreme right of the extension 58 and hence move the sleeve 53 to the right as shown in Figures 1 and 4 of the drawings. This initially positions the sleeve 53 so that upon the actuation of the upset pilot valve 37 hydraulic fluid flows from the supply line 35 through appropriate ports in the upset control valve 27 to move the spool 52 to the right which directs hydraulic fluid to the platen moving cylinder by way of the fluid supply line 45, the amount of fluid delivered comprising between one-third to 40% of the total flow possible which acts to impart upset velocity to the piston 46 in the cylinder 43 and hence rapidly moves the platen 48 or other workpiece to flashing position. The upset pilot valve 37 comprises a solenoid operated valve as best illustrated in Figure 1 of the drawings.

By referring now to Figure 1 of the drawings it will be seen that a composite view of the flash welding control apparatus is disclosed complete with interconnecting piping. The view includes a horizontal section through the flash control valve 38 and the appended sequence starting valve 36 and a vertical section through the flashing and upset control valve 27 and its appended upset pilot valve 37.

It is believed that from the foregoing one skilled in the art will observe that the flash welding control apparatus comprises essentially the flashing and upset control valve 27 which directly controls the hydraulic fluid delivered by the pump 14 and the accumulator 25 to the platen moving piston and cylinder 46 and 43, respectively, the action of the flashing and upset control valve 27 being responsive to the operation of the piston 40 in the flash control valve 38, which is in turn responsive to the sequence starting valve 36 and the sleeve positioning valve 65 as hereinafter described. The movement of the piston 40 in the flash control valve 38 imparts predetermined movement to the cam 51 and hence the spool 52 of the flashing and upset control valve 27.

Assuming that the workpieces to be welded (not shown) have been secured in the stationary and movable platens of the flash welder control by the device and that the pump 14 is being operated by the motor 17 and hydraulic fluid is therefore being supplied the fluid supply lines 21, 33, 34 and 35, the operating cycle of the flash welding machine is initiated by the manual or automatic closing of a switch 68.

Closing the switch 68 closes a circuit and conductor 69 and first energizes the sleeve positioning valve 65 to move the sleeve 53 to the right, as shown in Figures 1 and 4 of the drawings and subsequently energizes the upset pilot valve 37. The hereinbefore described action of the hydraulic fluid moves the spool 52 to open a passageway between the inlet pipe 26 and the outlet pipe 45 whereby hydraulic fluid flows to the platen moving piston and cylinder assembly 46 and 43, respectively. As the platen moving piston 46 moves, it engages a limit switch 70 which opens the switch 68, de-energizing the sleeve positioning valve 65 and the upset pilot valve 37 and a closes a circuit and energizes a solenoid 72 to activate the sequence starting valve 36 whereupon hydraulic fluid moves the piston 39 and hence imparts movement to the cam 51, as heretofore described, and moves the spool 52 toward the right in controlled, progressively increasing flashing velocity as determined by the cam 51.

It will occur to those skilled in the art that the cam 51 is adjustably mounted on the cam arm 42 so that it may be predetermined as follows: the slowest rising curve being obtained when the cam 51 is rotated clockwise to the end of its adjustment. The greatest platen acceleration is obtained with the cam rotated to its full counterclockwise position.

A piston valve 73 in the sequence starting valve 36 is normally biased to closed position by a coil spring 74 located adjacent one end of the piston valve 73. Motion of the solenoid 72 moves the piston valve 73 to the right, compresses the spring 74 and opens a fluid passageway from an inlet port 75 which is in communication with the hydraulic fluid supply line 34 and establishes communication with a channel 77. The channel 77 is under the control of a variable flow control valve 78.

The channel 77 communicates with the right hand portion of the flash control valve 38, and, responsive to the introduction of hydraulic fluid thereinto, the piston 40 in the flash control valve 38 will move to the left. The left end of the piston 40 is connected by means of the link 41 with the cam arm 42 heretofore referred to and the cam 51 is thus moved responsive to the motion of the piston 40. The flow control valve 78 controls the amount of fluid delivered to the flash control valve 38 and hence controls the rate of travel of the piston 40 and hence the movement of the cam 51.

The flow control valve 78 is a metering valve and, as may be seen by referring to Figure 2 of the drawings, is provided with a manually adjustable control lever 80 by means of which the metering action of the flow control valve 78 may be controlled and preset. It will thus be seen that the sole function of the flash control valve 38 and its appended sequence starting valve 36 is to impart controlled mechanical motion to the cam 51 which in turn moves the spool 52 of the flashing and upset control valve 27. The flashing and upset control valve 27 and its appended upset pilot valve 37 control the actual hydraulic fluid delivered to the cylinder 43 for actuating the piston 46 which is connected with the movable platen 48 of the flash welder as heretofore described.

Still referring to Figure 1 of the drawings it will be seen that the fluid supply line 21 conveys hydraulic fluid to the inlet port 26 of the flashing and upset control valve 27 which communicates with an annular chamber 81 formed about the sleeve 53 by a cylindrical body member 82 which has spaced annular channels formed on its innermost surface and apertures communicating with said channels.

Hydraulic fluid introduced into the channel 81 (which comprises one of the annular channels in the cylindrical body member 82) thereby completely encircles the sleeve 53 and one or more apertures 83 in the sleeve are provided to convey the hydraulic fluid to the chamber within the sleeve and between a pair of spaced tapered heads 84 and 85 on the spool 52. As the spool 52 is moved to the right by the cam 51, as heretofore described, the head 85 will expose one or more orifices 86 in the sleeve 53. The orifice 86 establishes communication with an annular channel 87 in the cylindrical body member 82. The annular channel 87 is in communication with the outlet port 44 of the flashing and upset control valve 27. The fluid supply line 45 connects the outlet 44 with the closed end of the cylinder 43 so that hydraulic fluid is delivered to the cylinder 43 and moves the piston 46 and hence the movable platen 48 of the flash welding apparatus.

It will be observed that the head 85 on the spool 52 is provided with oppositely disposed tapers at different angles on its opposite sides so that a metering action is had with respect to the delivery of hydraulic fluid to the aperture 86 with the result that the movement imparted to the movable platen 48 is always smooth. It will also be seen that the position of the sleeve 53 meters the fluid delivered to the cylinder 43.

Simultaneously with the delivery of hydraulic fluid to the cylinder 43 and the movement of the platen 48 by the piston 46, as just described, the head 84 on the spool 52 moves to open an aperture 88 in the sleeve 53 which communicates with an annular chamber 89 in the cylindrical body member 82. The annular chamber 89 communicates with the inlet port 50 and the return fluid line 49 establishes communication between the inlet port 50 and the opposite end of the cylinder 43 so that hydraulic fluid therein and being discharged therefrom through the return fluid line 49 is gradually admitted to the chamber within the sleeve 53 and to the left of the head 84 by the metering action of the tapered head 84. The hydraulic fluid thus admitted flows through one or more apertures 90 in the sleeve 53 into an annular chamber 91 formed in the cylindrical body member 82 which communicates with an outlet port 92. A return line 93 establishes communication between the outlet port 92 and the tank 10 so that the hydraulic fluid is thus delivered thereto.

Still referring to Figure 1 of the drawings it will be observed that the piston 46 and the movable platen 48 will move to the right responsive to the admission of hydraulic fluid to the cylinder 43 under the predetermined control of the flashing and upset control valve 27, it being observed that the relative movement of the spool 52 carrying the heads 84 and 85 with respect to the sleeve 53 is controlled by the cam 51 heretofore disclosed and described whereby a desirable flashing curve or progressive motion of the movable plate 48 is achieved. The connecting rod 47 through which motion is imparted to the movable platen 48 is provided with a cam 94 which engages a switch 95 controlling a circuit 96. The circuit 96 is a secondary energizing circuit with respect to the circuit 69 which also energizes the solenoid 97 of the upset pilot valve 37.

It will thus be seen that the upset pilot valve 37 is actuated twice during one operating cycle, it being remembered that it was initially operated subsequent to the operation of the sleeve positioning valve 65 to initially pass hydraulic fluid directly through the upset control valve 27 to the cylinder 43 and thus cause the rapid initial movement of the platen moving piston 46 which serves to close up the irregular spacing of the platen and bring the same to a predetermined start of flashing position.

The initial energization of the solenoid 97 and actuation of the upset pilot valve 37 is only momentary whereupon the solenoid 97 is de-energized and is not subsequently re-energized until the conclusion of the flashing cycle or movement of the platen 48 which brings the cam 94 into engagement with the switch 95 and closes the secondary circuit 96, again energizing the solenoid 97 to direct a large volume of hydraulic fluid to the cylinder 43 and hence rapidly move the piston 46 in the upset portion of the welding cycle.

Still referring to Figure 1 of the drawings the construction and operation of the upset pilot valve 37 may be seen. The solenoid 97 is directly connected with the piston valve 98 in the upset pilot valve 37. The piston valve 98 is normally biased to the right by a coil spring 99 in which position heads 100 and 101 block an inlet orifice 102 which is in communication with the fluid supply line 35, heretofore referred to, and hence with a source of hydraulic fluid from the pump 14. Operation of the solenoid 97 moves the piston valve 98 to the left and establishes communication between an inlet port 102 and an outlet port 103 which communicates with a channel 104 in the flashing and upset control valve 27 and whereby hydraulic fluid is delivered to a chamber 105 in the flashing and upset control valve 27 adjacent a head 106 on the spool 52 so that the hydraulic fluid immediately moves the spool 52 in the sleeve 53 to the right accelerating the motion heretofore imparted thereto by the cam 51 (as heretofore described) and immediately fully opens the flashing and upset ports 86, 87 and 44 whereby a large volume of hydraulic fluid is delivered to the line 45 and the cylinder 43 which results in an immediate upsetting motion imparted to the platen 48 by the piston 46 responsive to the fluid action. Simultaneously with such action, the head 84 on the spool 52 is moved into fully open position with respect to the return line 49 and the inlet ports 50, 89 and 88 so that hydraulic fluid on the opposite side of the piston 46 can be immediately delivered to the return line 93 and the supply tank 10.

It will occur to those skilled in the art that automatic timing devices can be incorporated in the controlling circuits heretofore mentioned so that the period of energization of the solenoids 72 and 97, respectively, can be predetermined. At such time as the upset solenoid 97 is energized, the solenoid 72 controlling the sequence starting valve 36 is de-energized permitting the spring 74 to return the piston valve 73 therein to normal position at the left hand end of the sequence starting valve 36 and opening a communication line between the inlet port 75 and a fluid channel 107 which communicates with a chamber 108 in the flash control valve 38 and hydraulic fluid is thereby delivered to the left hand side of a head 109 on the piston 40 so as to move the same to the right thereby resetting the cam 51 for a subsequent welding operation.

After a suitable time interval, the solenoid 97 controlling the upset pilot valve 37 is de-energized and the spring 99 returns the valve piston 98 therein to normal position at the right hand end of the upset pilot valve 37 which closes communication between the inlet 102 and the outlet 103 thereof. Simultaneously, a port 111 is placed in communication with a fluid channel 112 in the upset pilot valve 37. The fluid channel 112 communicates with an annular chamber 113 in the flashing and upset control valve 27 which in turn communicates by way of a port 114 with a portion of the return line 93. It will thus be seen that hydraulic fluid in the chamber 105 is able to flow through the channels 104 and 112 and the annular chamber 113 to the return line 93 and back to the tank 10. The spring 54 moves the spool 52 to the left to reset the valve for a subsequent welding operation and such action establishes communication between the inlet port 26 in the valve 27 with the annular chamber 81 about the cylindrical body member 82 and by way of the orifices 83 and 88 with the annular chamber 89 and the outlet port 50 so that hydraulic fluid then flows through the line 49 to the rod end of the cylinder 43 and thereby moves the piston 46 to the left to return the platen 48 to starting position for a subsequent welding operation.

Simultaneously with the above described action, the sleeve positioning valve 65 is de-energized, and, being spring centered, returns to inoperative position enabling the spring 64 in the head 59 to return the sleeve 53 to its initial position.

It will thus be seen that the initial advancing, flashing and upset cycle is completed automatically once the switch 68 is closed energizing the sleeve positioning valve 65.

It will thus be seen that in a complete platen advancing, flashing and upset welding cycle initial advancing movement of the platen starts immediately upon the closing of the switch 68 and the subsequent actuation of the solenoid 97 which together result in positioning the sleeve 53 for rapid by-pass of hydraulic fluid and opening of the valve piston 98 to initially move the spool 52 to permit flow of the hydraulic fluid direct to the platen moving cylinder 43. The platen 48 thus closes whatever irregular distance exists immediately and the flashing starts when the platen moving piston and rod 46 and 47 reach a predetermined point closing the switch 70 and actuating the sequence starting valve 36. Following this, the piston 40 moves to the left and moves the cam 51 through its interconnecting linkage which directly moves the spool 52 to the right and opens the communication channels between the inlet port 26 and the orifices with the result that the movable platen 48 moves in the flashing portion of the welding cycle.

It will occur to those skilled in the art that the speed of the movable platen 48 increases in accordance with the presetting of the cam 51, as heretofore described, so that a desirable completely variable flashing curve is achieved. It will also be noted that the action of the piston 40 in moving the cam 51 is controlled by the flow control valve 78 which is also variable. As the relative motion between the spool 52 and the sleeve 53 progresses, the motion of the platen 48 increases as desired in the flashing cycle.

At such time as the cam 94 on the connecting rod 47 through which the movable platen 48 is moved, reaches a predetermined upsetting point, the upsetting action is superimposed on the flashing action with no hesitancy. This occurs by the secondary energization of the solenoid 97 and its operation of the upset pilot valve 37 which immediately delivers fluid pressure to the chamber 105 in the valve 27 and instantly moves the spool 52 to the right to fully open the flashing orifices with respect to the annular chambers in the cylindrical body member 82. Full hydraulic pressure is thus instantly delivered to the cylinder 43 which results in the immediate upsetting action imparted the movable platen 48.

It will be obvious to those skilled in the art that a time delay mechanism may be incorporated if desired to control the length of time of the upset cycle. Alternately, the switch 95 may be manually opened to permit the upset solenoid 97 to be de-energized. At such time as the upset solenoid 97 is energized, the starting sequence solenoid 72 is de-energized either automatically or manually which thereby permits fluid pressure to reset the piston 40 and the cam 51. Following the conclusion of the upset cycle, the de-energization of the upset solenoid 97 will permit the upset pilot valve 37 to reset and drain fluid from the valve 27 and thereby permit the spring 54 in the same to reset the spool 52 therein. Simultaneously, the spring 64 in the interior of the device will reset the sleeve 53 and the complete apparatus is then ready for a subsequent welding operation.

It will thus occur to those skilled in the art that the complete rapid initial advance motion, the flashing and the upsetting cycle provided by the control apparatus occurs by reason of the relative movement of the spool 52 and the sleeve 53 in the valve 27 and that this relative movement is capable of being varied by the flashing curve control cam 51 and the setting of the flow control valve 78. The only interconnection between the movable platen 48 and the apparatus is the means actuating the switch 70 and the switch 95 controlling the sequence starting valve 36 and the upset solenoid 97. The time of operation of the switch 95 is dependent on the prior operation of the apparatus which is imparting controlled flashing cycle motion to the connecting rod 47 which carries the means actuating the switch 95.

It will thus be seen that the several objects of the invention are met by the hydraulic flash welder control disclosed herein.

Having thus described my invention, what I claim is:

1. Hydraulic control apparatus for a flash welder having a normally fixed platen and a movable platen operated by a fluid pressure motor, said apparatus acting to control the movement of the movable platen prior to and during a welding cycle and comprising in combination a source of hydraulic fluid under pressure, a valve for controlling the flow of fluid from said source to said motor, said valve having two relatively movable valve elements, a secondary fluid pressure operated motor, variable motion transmitting mechanism interconnecting said secondary fluid pressure operated motor and one of said valve elements to move said element relatively to the other of said valve elements in such a manner that the movement of the platen will follow a predetermined position speed relationship during the flashing period of said cycle, a third fluid pressure operated motor for moving the other of said valve elements to initially by-pass said hydraulic fluid to bring the movable platen to starting position of said welding cycle.

2. Apparatus according to claim 1 and further including a solenoid actuated four-way valve for controlling said third fluid pressure operated motor.

3. Apparatus according to claim 1 and further including a solenoid actuated four-way valve for controlling said third fluid pressure operated motor, and limit switches on said movable platen for controlling said four-way valve.

4. Apparatus according to claim 1 and further including a secondary metering valve controlling said secondary fluid operated motor.

5. In a hydraulic control for a flash welder having a normally fixed platen and a movable platen, means to control the movement of the movable platen prior to and during the welding cycle comprising in combination a source of hydraulic fluid under pressure, a fluid pressure operated motor for moving said movable platen, valve means for controlling the flow of fluid from said source to said motor, said valve means having two relatively movable valve elements, a secondary fluid pressure operated motor, a solenoid valve in communication with said source of hydraulic fluid, said secondary fluid pressure operated motor responsive in operation to opening of said solenoid valve, variable motion transmitting means interconnecting said secondary fluid pressure operated motor and one of said valve elements to move the said valve element in such manner that the movement of the platen will follow a predetermined position speed relationship during the flash period of said cycle, a third fluid pressure operated motor connected to the other one of said valve elements, a four-way solenoid valve in communication with said source of hydraulic fluid, said third fluid pressure operated motor responsive in operation to the opening and closing of said four-way solenoid valve to move the other of said valve elements in such manner that the movable platen will advance rapidly to starting position of said flashing period of said cycle.

No references cited.